(12) United States Patent
Duncan et al.

(10) Patent No.: US 10,302,409 B1
(45) Date of Patent: May 28, 2019

(54) SUPER-PIC SPIDER

(71) Applicant: LOCKHEED MARTIN CORPORATION, Bethesda, MD (US)

(72) Inventors: Alan Lee Duncan, Sunnyvale, CA (US); Richard Lee Kendrick, San Mateo, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 55 days.

(21) Appl. No.: 15/789,892

(22) Filed: Oct. 20, 2017

(51) Int. Cl.
*G01B 9/02* (2006.01)
*G02B 6/12* (2006.01)

(52) U.S. Cl.
CPC ..... *G01B 9/02027* (2013.01); *G01B 9/02038* (2013.01); *G01B 9/02041* (2013.01); *G01B 9/02051* (2013.01); *G02B 6/12002* (2013.01); *G02B 2006/12102* (2013.01)

(58) Field of Classification Search
CPC ............ G01B 9/02027; G01B 9/02038; G01B 9/02041; G01B 9/02051; G02B 6/12002; G02B 2006/12102
See application file for complete search history.

(56) References Cited

U.S. PATENT DOCUMENTS

| | | | |
|---|---|---|---|
| 6,330,378 B1 * | 12/2001 | Forrest | G02B 6/12002 372/50.21 |
| 6,795,622 B2 * | 9/2004 | Forrest | B82Y 20/00 372/6 |
| 8,913,859 B1 * | 12/2014 | Duncan | G02B 6/06 356/477 |
| 9,754,985 B1 * | 9/2017 | Duncan | G02B 6/26 |
| 10,012,827 B1 * | 7/2018 | Duncan | G01B 9/02051 |
| 2005/0018947 A1 * | 1/2005 | Li | G02B 6/12009 385/14 |
| 2019/0011559 A1 * | 1/2019 | Desai | G01S 17/32 |

* cited by examiner

*Primary Examiner* — Michael A Lyons
(74) *Attorney, Agent, or Firm* — Morgan, Lewis & Bockius LLP

(57) ABSTRACT

An apparatus includes a number of photonic integrated circuit (PIC) imaging detector arrays, and multiple electronic integrated circuits (ICs) coupled to the PIC imaging detector arrays. Each PIC imaging detector array of includes a number of lenslets and a number of waveguides. At least some of the lenslets are coupled to multiple waveguides, and sets of two lenslets are configured to form interferometer channels.

20 Claims, 5 Drawing Sheets

SUPER-PIC SPIDER

STATEMENT REGARDING FEDERALLY SPONSORED RESEARCH OR DEVELOPMENT

Not applicable

FIELD OF THE INVENTION

The present invention generally relates to electro-optical imaging, and more particularly, to a super-photonic integrated circuit (PIC) segmented planar imaging detector for electro-optical reconnaissance (SPIDER).

BACKGROUND

New sensor platforms under development, such as high altitude, long endurance UAV's and low cost small satellites require electro-optical (EO) imaging sensors with low mass and power requirements and have constrained volume requirements. Conventional EO imaging sensors cannot meet these constraints without severely limiting their capability. Space situational awareness missions are seeking more affordable EO sensor systems that can meet wide angle search requirements. More affordable means reduced mass, volume and power while still achieving moderate to large apertures. The segmented planar imaging detector for electro-optical reconnaissance (SPIDER) concept can achieve the performance capability needed by these missions in a radically compressed and low mass and/or power package. The SPIDER concept satisfies these needs but its limited field-of-view or image size needs improvement.

SUMMARY

According to various aspects of the subject technology, methods and configurations for increasing the field-of-view and the image size of the segmented planar imaging detector for electro-optical reconnaissance (SPIDER) concept are provided. In some aspects, the super-photonic integrated circuit (PIC) imaging detector array concept extends SPIDER's capabilities by stacking PIC imaging detector arrays in each SPIDER blade such that the number of interferometer channels is increased by a substantial factor (e.g., 16).

In one or more aspects, an apparatus includes a number of photonic integrated circuit (PIC) imaging detector arrays, and multiple electronic integrated circuits (ICs) coupled to the PIC imaging detector arrays. Each PIC imaging detector array includes a number of lenslets and a number of waveguides. At least some of the lenslets are coupled to multiple waveguides, and sets of two lenslets are configured to form interferometer channels.

In other aspects, a method for forming a number of PIC imaging detector arrays is provided. Each PIC imaging detector array is formed by providing a number lenslets and multiple waveguides. At least some of the lenslets are coupled to a number of waveguides. Sets of two lenslets are configured to form interferometer channels. The PIC imaging detector arrays are coupled to form a super-PIC imaging detector array.

In yet other aspects, a SPIDER includes a substrate and a number of super-PIC imaging detector arrays assembled on the substrate. Each super-PIC imaging detector array includes a number of PIC imaging detector arrays. Each PIC imaging detector array is coupled to an electronic IC and includes a number of lenslets and a number of waveguides. At least some of the lenslets are coupled to multiple waveguides, and sets of two lenslets are configured to form interferometer channels.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

Figure 1:
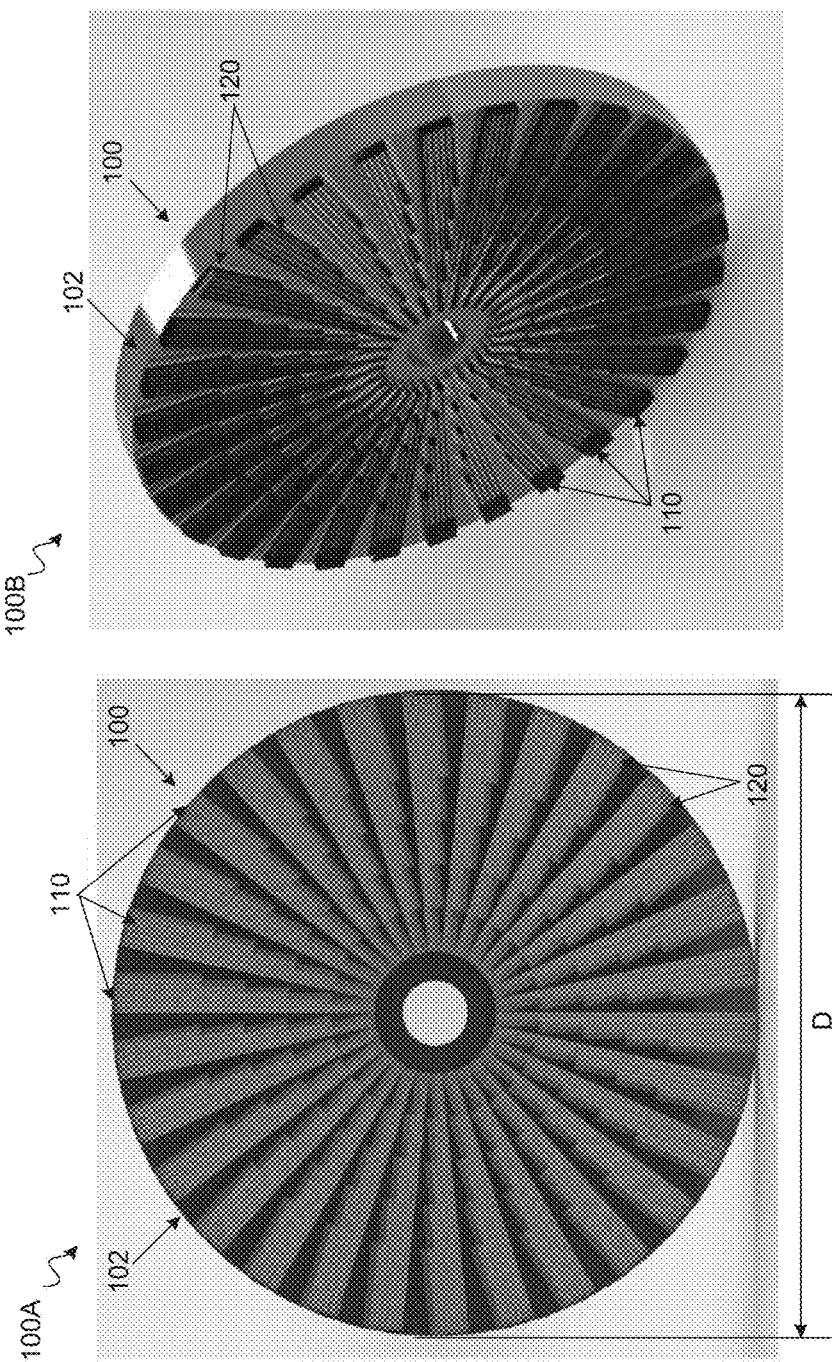
FIGS. 1A-1B ae high-level diagrams illustrating different views of an example of a segmented planar imaging detector for electro-optical reconnaissance (SPIDER) including a number of super-photonic integrated circuit (PIC) imaging detector arrays, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to systems and configurations for increasing the field-of-view and the image size of the segmented planar imaging detector for electro-optical reconnaissance (SPIDER) concept. In some aspects, the super-photonic integrated circuit (PIC) concept extends SPIDER's capabilities by stacking PICs in each SPIDER blade such that the number of interferometer channels is increased by a substantial factor (e.g., 16). SPIDER is a multiple baseline, direct detection interferometric imaging sensor. SPIDER uses nano-optics technology including micron scale waveguides, switches, phase modulators, beam combiners, and detectors on a silicon chip to form millions of simultaneous optical interconnects and detections, the equivalent of hundreds of megapixels of image data. The SPIDER design is modular so that the sensing elements can be arrayed in a planar disk or distributed conformally on a large surface such as a UAV wing structure.

The subject super-PIC SPIDER concept is a solution, an enabling technology of which is being driven rapidly by the computer industry, which is seeking a next generation of computer chips that include millions of optical interconnects to increase speed and interconnect density on the chip. The super-PIC SPIDER is an EO imaging sensor that has a substantially reduced size, weight and power (e.g., by a factor of 10 to 100) compared to traditional imaging sensors.

SPIDER can measure complex visibilities at different spatial frequencies, from which an image is reconstructed in a processor. Each complex visibility measurement is made by an interferometer channel which samples the incoming optical wavefront at two different points and adds the light coherently to form interference fringes. The amplitude and phase of the interference fringe corresponds to a complex visibility. The spatial frequency is a function of the distance and orientation of the displacement vector connecting the two points where the wavefront is sampled. In SPIDER the light from the object to be imaged is collected by small lenses (e.g., lenslets) that form low resolution images on the edge of PIC.

In some aspects, waveguides embedded in the PICs sample the light from multiple (e.g., 16) different parts of the low resolution images. For example, the 16 samples are divided in groups of 4 on 4 different PICs that when taken together can uniformly sample the low resolution image. The final reconstructed image is, therefore, multiple (e.g., 16) times larger than the image reconstructed from a single waveguide interferometer channel.

In some implementations, the PICs are arranged in stacks of N (e.g., 5) PICs with different lengths, referred to a super-PIC, to fit into an angular wedge. In one or more implementations, multiple (e.g., 30) of super-PICs are arranged radially in a disk geometry to form a complete super-PIC SPIDER imaging sensor. This geometry can uniformly sample the spatial frequency domain to provide sufficient data to fully reconstruct an image. The interference fringe detectors are embedded in the PIC. Electrical signals are extracted via copper pads at the surface of the PIC. Each PIC is flip bonded to an electronic IC that processes the detector signals.

FIGS. 1A-1B ae high-level diagrams illustrating different views 100A and 100B of an example of a SPIDER 100 including a number of super-PIC imaging detector arrays 110, according to certain aspects of the disclosure. FIG. 1A depicts a top view 100A of the SPIDER 100 including a substrate 102, a number of super-PIC imaging detector arrays 110 assembled on the substrate 102. Each PIC imaging detector array (hereinafter "PIC") of the super-PIC 110 is coupled (e.g., flip bonded) to an electronic IC 120 that can process detector signals from the respective PIC of the super-PIC 110. In some implementations, the substrate 102 may be made of a suitable material such as a metal or a metallic alloy, for example, stainless steel, aluminum, tungsten or other suitable material. The super-PICs 110 are formed such that they can be optimally assembled over the substrate 102. The optimal assembly refers to a high packing factor of the super-PICs on the substrate 102 with minimum unused area on the substrate 102. The high packing factor of the super-PICs 110 allow providing substantially larger (e.g., 16 times) images and larger field of views (e.g., 4 times), as compared to the existing PICs. In some implementations, a diameter D of the substrate 102 of the spider 100 is larger than about 250 mm, although other values for the diameter D can be used.

FIG. 1B depicts a perspective view 100B of the SPIDER 100 showing the substrate 102, the super-PICs 110 and the electronic ICs 120, as described above and discussed in more details herein.

Figure 2:
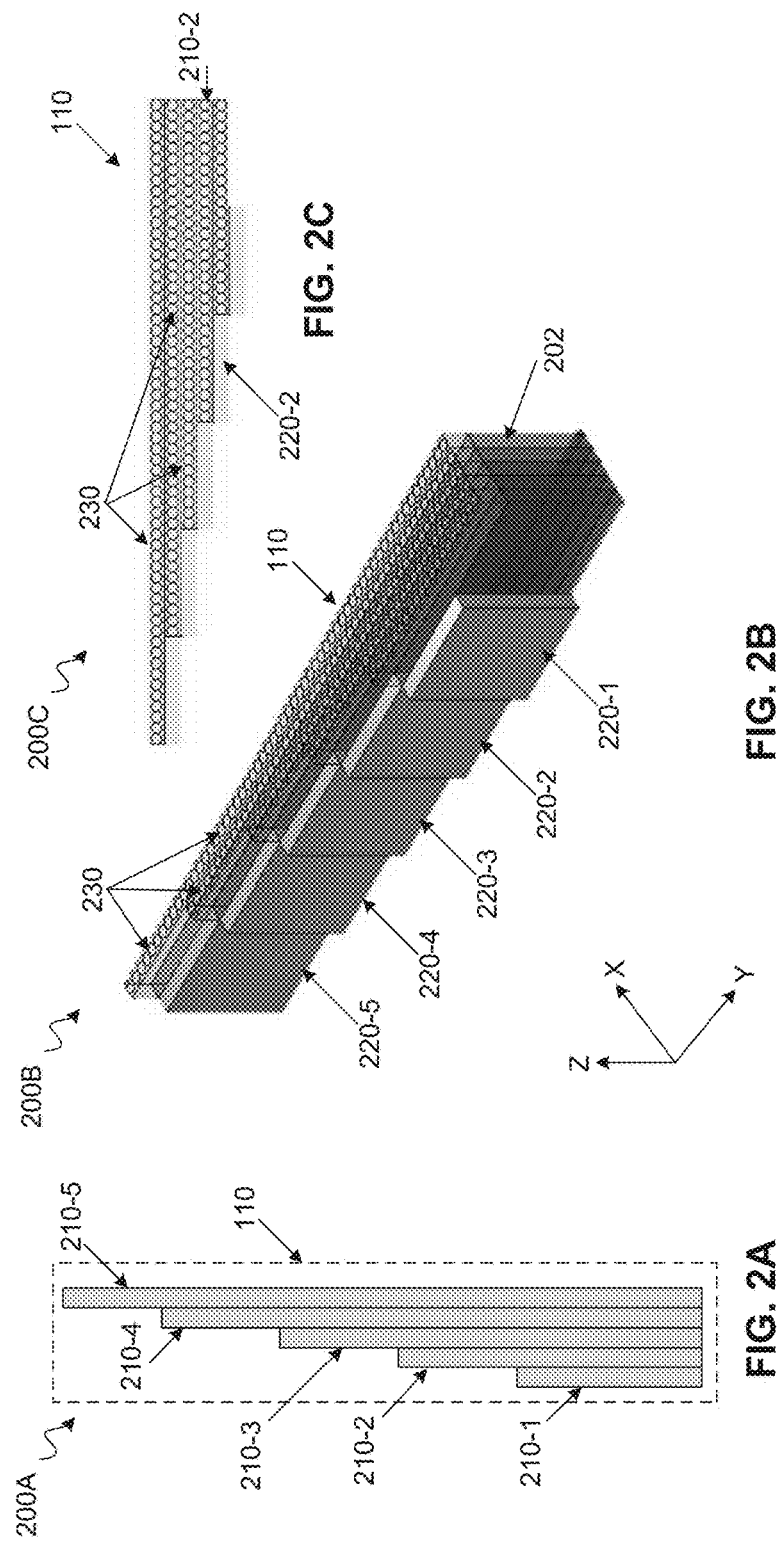
FIGS. 2A through 2C are schematic diagrams illustrating various views of an example of a super-PIC imaging detector array, according to certain aspects of the disclosure.

FIGS. 2A through 2C are schematic diagrams illustrating various views 200A, 200B and 200C of an example of a super-PIC 110, according to certain aspects of the disclosure. The schematic top view 200A shows an example super-PIC 110 including five PICs 210 (e.g., 210-1 to 210-5). The arrangement of the PICs 210 are such that the super-PIC 110 can fill an area corresponding to a circular sector of a substrate (e.g., a circular-shape substrate such as 102 of FIG. 1A) with a predefined angle (e.g., about 6 degrees). In some implementations, a length (along the Y axis) of the first PIC 210-1 can be about 120 mm. In one or more implementations, lengths (along the Y axis) of the PICs 210-2, 210-3, 210-4 and 210-5 can be about 100 mm, 80 mm, 60 mm and 40 mm, respectively. In some implementations, a width (e.g., along the X axis) of each PIC can be about 3 mm.

FIG. 2B shows a perspective (e.g., 3-dimensional) view 200B of the Super-PIC 110 and the attached electronic ICs 220. Each of the PICs 210-1 to 210-5 is coupled to a respective electronic ICs 220 (e.g., 220-1 to 220-5) that processes the signals from that PIC. In some implementations the electronic ICs 220 may partially process the signals from the PICs 210 and the additional processing may be performed by an additional processor (e.g., a general processor of a host system). Also shown in FOG. 2B are the lenslets 230. Each PIC 210 includes an array of lenslets 230. In some aspects, some lenslets of the array of lenslets 230 are coupled to a number of (e.g., four) waveguides 202. The waveguides 202 (not individually visible in the perspective view 200B) extend downward along the Z axis from the lenslets 230. In some implementations, the waveguides 202 are micron scale waveguides that are coupled to nano-optical technology devices including switches, phase modulators, beam combiners, and detectors. The nano-optical technology devices may be fabricated on a chip (e.g., a semiconductor chip such as a silicon chip) to form millions of simultaneous optical interconnects and detectors that can handle an equivalent of hundreds of megapixels of imaging data.

FIG. 2C shows a top view 200C of the Super-PIC 110 and the attached electronic ICs 220. Each PIC 210 (e.g., 210-2) includes an array (e.g., a linear array) of lenslets 230, some of which are coupled to a number of (e.g., four) waveguides.

Figure 3:
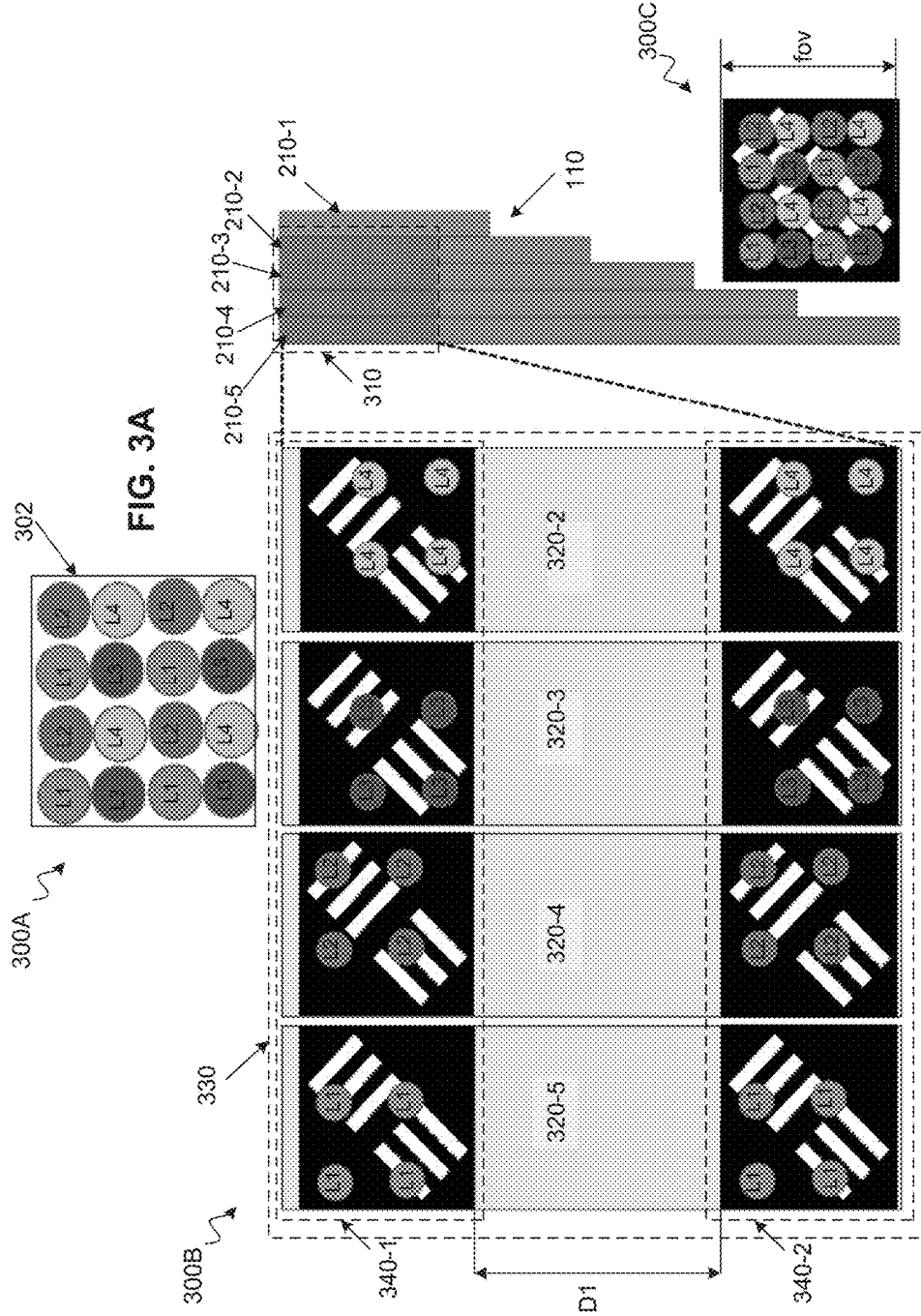
FIGS. 3A through 3C are schematic diagrams illustrating example waveguide arrangements in interferometric channels of a super-PIC imaging detector array, according to certain aspects of the disclosure.

FIGS. 3A through 3C are schematic diagrams illustrating example waveguide arrangements in interferometric channels 340 of a super-PIC imaging detector array 110, according to certain aspects of the disclosure. An example arrangement of waveguides in a baseline 302 are shown in FIG. 3A. In this example arrangement, waveguides of the baseline 302 are divided in four groups (e.g., L1, L2, L3 and L4), and each group is coupled to a lenslet (e.g., 230 of FIGS. 2B and 2C). Each PIC 210 of the super-PIC 110 may include one or more baselines. For example, each of the PICs 210-1, 210-2, 210-3, 210-4 and 2105 may respectively include 1, 2, 2, 3 and 4 baselines, although other combination of number of baselines may also be acceptable.

FIG. 3B shows the super-PIC 110 and an expanded view 330 of a portion 310 of the PICs 210-2, 210-3, 210-4 and 210-5. The expanded view 330 depicts two baselines 340-1 and 340-2 of the PICs 210-2, 210-3, 210-4 and 210-5 that are physically separated by a distance D. In some implementations, the distance D can be equivalent of a dimension of one or more baselines, depicted by areas 320-2 to 320-5. The waveguides L1, L2, L3 and L4 of the two baselines 340-1 and 340-2 are coupled to four sets of two lenslets which form four separate interferometer channels. For example, the waveguides L1 of the baseline 340-1 are coupled to a first lenslet and the waveguides L1 of the baseline 340-2 are coupled to a second lenslet, and the first and second lenslets (not shown in FIG. 3B for simplicity) form an interferometer channel. The waveguides of each interferometer channel cover a specific portion (e.g., ¼ of the area) of an image. This is clearly shown in the image 300C shown in FIG. 3C, in which the entire image is represented by four waveguide groups of each baseline. In some implementations, the waveguides forming a baseline can be selected from the waveguides of the PICs 210 and do not have to be selected from the portion 310 of PICs 210-2 to 210-5. The image shown in FIG. 3C is 16 times larger and has a filed-of view (fov) that is four times larger than when the baseline is a single-waveguide baseline, as in the existing SPIDER. Accordingly, the subject technology substantially increases the size and fov of the SPIDER image.

Figure 4:
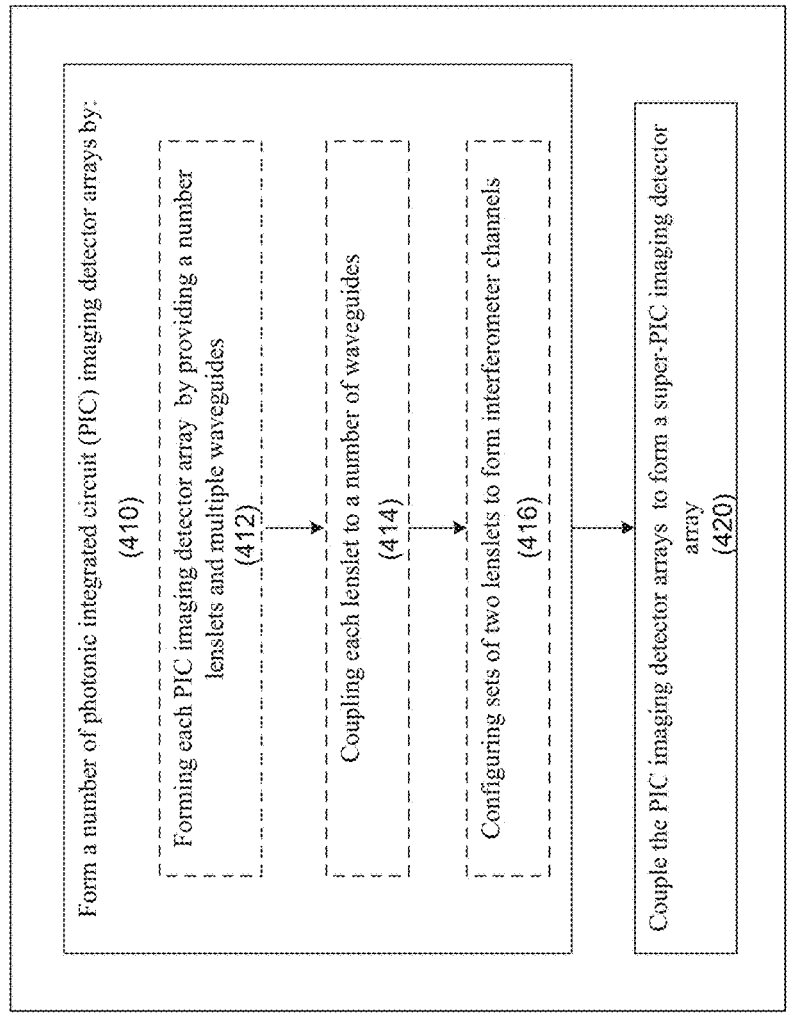
FIG. 4 is a flow diagram illustrating an example method of providing a super-PIC imaging detector array, according to some aspects of the subject technology.

FIG. 4 is a flow diagram illustrating an example method 400 of providing a super-PIC (e.g., 110 of FIG. 1A or 2A), according to some aspects of the subject technology. The method 400 begins by forming each PIC (e.g., 210 of FIG. 2A) by providing a number lenslets (e.g., 230 of FIG. 2C) and multiple waveguides (e.g., 302 of FIG. 3A). At least some of the lenslets are coupled to a number of waveguides (e.g., L1 of FIG. 3A). Sets of two lenslets are configured to form interferometer channels (e.g., lenslets coupled to baselines 340-1 and 340-2 of FIG. 3B). The PIC imaging detector arrays are coupled to form a super-PIC imaging detector array (e.g., 110 of FIG. 1A or 2A).

Figure 5:
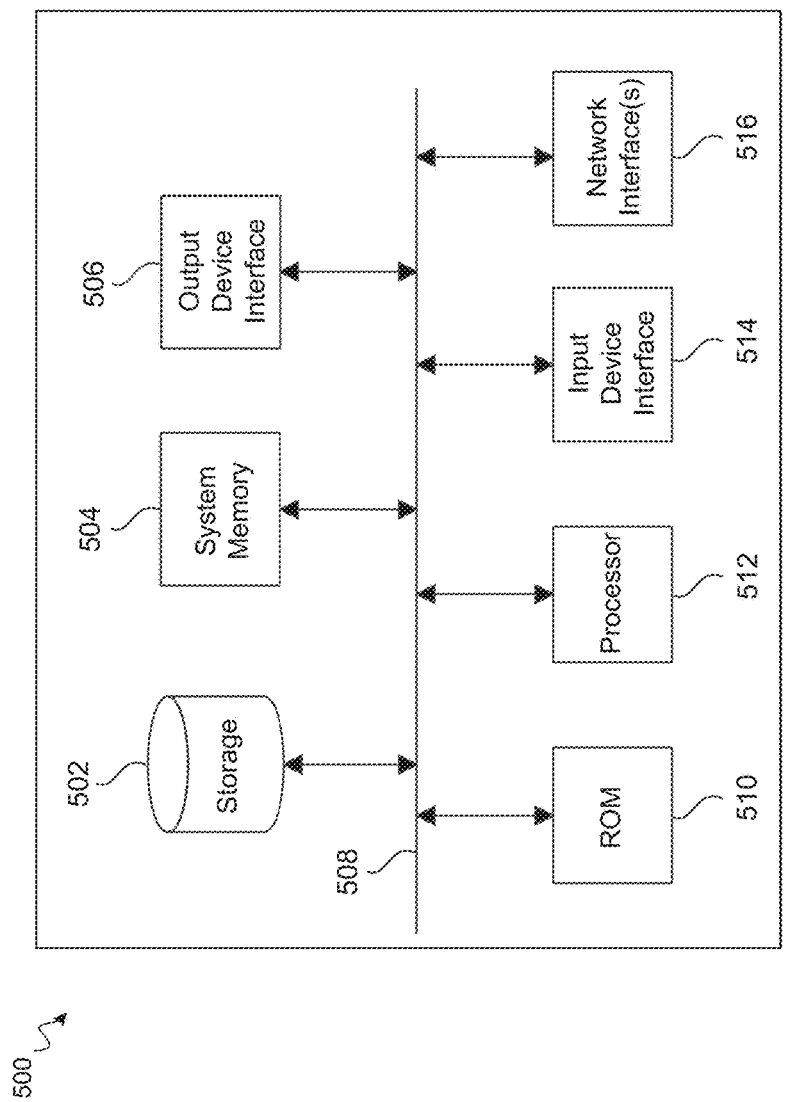
FIG. 5 is a block diagram conceptually illustrating an electronic system 500 with which aspects of the subject technology are implemented.

FIG. 5 is a block diagram conceptually illustrating an electronic system 500 with which aspects of the subject technology are implemented. The electronic system 500, for example, can be a network device, a media converter, a desktop computer, a laptop computer, a tablet computer, a server, a switch, a router, a base station, a receiver, a phone, or generally any electronic device that transmits signals over a network. Such an electronic system 500 includes various types of computer readable media and interfaces for various other types of computer readable media. In one or more implementations, the electronic system 500 can be, and/or can be a part of system that processes signals from the super-PICs of the SPIDER (e.g., 100A of FIG. 1A) of the subject technology. The electronic system 500 includes a bus 508, one or more processing unit(s) 512, a system memory 504, a read-only memory (ROM) 510, a permanent storage device 502, an input device interface 514, an output device interface 506, and a network interface 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system. The permanent storage device 502, on the other hand, is a read-and-write memory device. The permanent storage device 502 is a non-volatile memory unit that stores instructions and data even when the electronic system 500 is off One or more implementations of the subject disclosure use a mass storage device (such as a magnetic or optical disk and its corresponding disk drive) as the permanent storage device 502.

Other implementations use a removable storage device (such as a floppy disk, flash drive, and its corresponding disk drive) as the permanent storage device 502. Like the permanent storage device 502, the system memory 504 is a read-and-write memory device. However, unlike the permanent storage device 502, the system memory 504 is a volatile read-and-write memory, such as random access memory. System memory 504 stores any of the instructions and data that the one or more processing unit(s) 512 needs at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input device interface 514 and the output device interface 506. The input device interface 514 enables a user to communicate information and select commands to the electronic system. Input devices used with the input device interface 514 include, for example, alphanumeric keyboards and pointing devices (also called "cursor control devices"). The output device interface 506 enables, for example, the display of images generated by the electronic system 500. Output devices used with the output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks (not shown) through one or more network interfaces 516. In this manner, the computer can be a part of one or more network of computers, such as a peer-to-peer network, a local area network ("LAN"), a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, eTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. An apparatus comprising:
   a plurality of photonic integrated circuit (PIC) imaging detector arrays; and a plurality of electronic integrated circuits (ICs) coupled to the plurality of PIC imaging detector arrays, wherein:

each PIC imaging detector array of the plurality of PIC imaging detector arrays comprises a plurality of lenslets and a plurality of waveguides, at least some lenslets of the plurality of lenslets are coupled to multiple waveguides of the plurality of waveguides, and sets of two lenslets of the plurality of lenslets are configured to form interferometer channels.

2. The apparatus of claim 1, wherein the plurality of PIC imaging detector arrays comprise linear PIC imaging detector arrays with different lengths that collectively form a super-PIC imaging detector array.

3. The apparatus of claim 2, wherein the super-PIC imaging detector array comprises multiple interferometer channels, and wherein a set of two lenslets forming each interferometer channel are separated by a respective linear distance.

4. The apparatus of claim 2, wherein each PIC imaging detector array of the super-PIC imaging detector array is configured as a linear array.

5. The apparatus of claim 4, wherein a respective length of each PIC imaging detector array of the super-PIC imaging detector array is configured to allow the super-PIC imaging detector array to substantially fill an area corresponding to a circular sector of a circular-shape substrate with a predefined angle.

6. The apparatus of claim 5, wherein the circular-shape substrate comprises a substrate of a segmented planar imaging detector for electro-optical reconnaissance (SPIDER), and wherein the predefined angle allows multiple super-PIC imaging detector arrays to be assembled optimally on the substrate of the SPIDER.

7. The apparatus of claim 6, wherein a length of a longest PIC imaging detector array of the super-PIC imaging detector array is larger than about 100 mm, wherein a diameter of the substrate of the SPIDER is larger than 250 mm, and wherein the predefined angle is about 6 degrees.

8. The apparatus of claim 1, wherein each PIC imaging detector array of the plurality of PIC imaging detector arrays comprises one or more baselines, and wherein each baseline comprise multiple waveguides of the plurality of waveguides.

9. The apparatus of claim 8, wherein each baseline comprise 16 waveguides of the plurality of waveguides, and wherein each set of four waveguides of the 16 waveguides are coupled to a lenslet of the plurality of lenslets.

10. A method comprising:

forming a plurality of photonic integrated circuit (PIC) imaging detector arrays, each PIC imaging detector array being formed by:

providing a plurality of lenslets and a plurality of waveguides;

coupling at least some lenslet of the plurality of lenslets to multiple waveguides of the plurality of waveguides; and configuring sets of two lenslets of the plurality of lenslets to form interferometer channels; and coupling the plurality of PIC imaging detector arrays to form a super-PIC imaging detector array.

11. The method of claim 10, further comprising coupling an electronic integrated circuit (IC) to each PIC imaging detector array of the super-PIC imaging detector array.

12. The method of claim 10, wherein the plurality of PIC imaging detector arrays of the super-PIC imaging detector array have different lengths.

13. The method of claim 10, wherein forming the super-PIC imaging detector array comprises providing multiple interferometer channels, and wherein configuring a set of two lenslets that form each interferometer channel comprises selecting two lenslets separated by a respective linear distance.

14. The method of claim 10, further comprising configuring a respective length of each PIC imaging detector array of the super-PIC imaging detector array to allow the super-PIC imaging detector array substantially fill a circular sector of a substrate with a predefined angle.

15. The method of claim 14, further comprising determining the predefined angle to allow multiple super-PIC imaging detector arrays to be assembled optimally over the substrate.

16. The method of claim 10, further comprising forming, for each PIC imaging detector array of the plurality of PIC imaging detector arrays, one or more baselines, wherein each baseline comprise multiple waveguides of the plurality of waveguides.

17. The method of claim 16, further comprising forming each baseline by using 16 waveguides of the plurality of waveguides including coupling each set of four waveguides of the 16 waveguides to a lenslet of the plurality of lenslets.

18. A segmented planar imaging detector for electro-optical reconnaissance (SPIDER), comprising:

a substrate; and a plurality of super-photonic integrated circuit (PIC) imaging detector arrays assembled on the substrate, wherein:

each super-PIC imaging detector array comprises a plurality of PIC imaging detector arrays, each PIC imaging detector array of the plurality of PIC imaging detector arrays is coupled to an electronic integrated circuit (IC), each PIC imaging detector array of the plurality of PIC imaging detector arrays comprises a plurality of lenslets and a plurality of waveguides, at least some lenslets of the plurality of lenslets are coupled to multiple waveguides of the plurality of waveguides, and sets of two lenslets of the plurality of lenslets are configured to form interferometer channels.

19. The SPIDER of claim 18, wherein a respective length of each PIC imaging detector array of the super-PIC imaging detector array is configured to allow the super-PIC imaging detector array to substantially fill an area corresponding to a circular sector of the substrate with a predefined angle.

20. The SPIDER of claim 18, wherein the super-PIC imaging detector array comprises multiple interferometer channels, and wherein a set of two lenslets forming each interferometer channel are separated by a respective linear distance.

* * * * *